United States Patent
Oohashi et al.

(10) Patent No.: US 6,885,129 B1
(45) Date of Patent: Apr. 26, 2005

(54) AC GENERATOR FOR VEHICLE

(75) Inventors: Atsushi Oohashi, Tokyo (JP);
Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 245 days.

(21) Appl. No.: 10/130,950

(22) PCT Filed: Sep. 26, 2000

(86) PCT No.: PCT/JP00/06608

§ 371 (c)(1),
(2), (4) Date: May 24, 2002

(87) PCT Pub. No.: WO02/27897

PCT Pub. Date: Apr. 4, 2002

(51) Int. Cl.[7] .................. H02K 19/22; H02K 1/24; H02K 3/04; H02K 9/06
(52) U.S. Cl. .................. 310/263; 310/179; 310/261
(58) Field of Search .................. 310/263, 261, 310/179

(56) References Cited

U.S. PATENT DOCUMENTS

| | | | | |
|---|---|---|---|---|
| 5,343,105 A | * | 8/1994 | Sakabe et al. | 310/179 |
| 5,757,102 A | * | 5/1998 | Adachi et al. | 310/263 |
| 6,373,166 B1 | * | 4/2002 | Asao et al. | 310/263 |
| 6,455,958 B1 | * | 9/2002 | Asao et al. | 310/51 |
| 6,459,186 B1 | * | 10/2002 | Umeda et al. | 310/208 |
| 6,501,204 B1 | * | 12/2002 | Oohashi et al. | 310/179 |
| 6,507,137 B2 | * | 1/2003 | Asao et al. | 310/208 |
| 6,525,443 B2 | * | 2/2003 | Asao | 310/201 |
| 2002/0030417 A1 | * | 3/2002 | Asao | 310/201 |
| 2002/0135257 A1 | * | 9/2002 | Umeda | 310/179 |

FOREIGN PATENT DOCUMENTS

| | | | | |
|---|---|---|---|---|
| EP | 1235331 | * | 9/2000 | H02K/19/22 |
| JP | WO02/27897 | * | 4/2002 | H02K/19/22 |
| JP | WO02/29960 | * | 4/2002 | H02K/19/22 |

* cited by examiner

Primary Examiner—Dang Le
Assistant Examiner—Heba Y. Elkassabgi
(74) Attorney, Agent, or Firm—Sughrue Mion, PLLC (57) ABSTRACT

An object of the present invention is to provide an automotive alternator achieving high output by overlapping a laminated core of a stator and yoke portions of a field rotor in an axial direction, and enabling high-speed and low-speed electromagnetic noise to be reduced by prescribing dimensional relationships in the stator and the field rotor.

In this automotive alternator, a ratio (R2/R1) between an outer radius R2 of a cylindrical portion of a Lundell-type core and an outer radius R1 of the Lundell-type core is set to a range from 0.50 to 0.54, and a ratio (Lc/Lp) between an axial length Lc of the laminated core and an axial length Lp of the Lundell-type core is set to a range from 0.55 to 0.70.

7 Claims, 7 Drawing Sheets

AC GENERATOR FOR VEHICLE

TECHNICAL FIELD

The present invention relates to an automotive alternator, and particularly to a Lundell-type core construction of an automotive alternator enabling claw resonance noise generated by magnetic attraction force acting on claw-shaped magnetic poles to be reduced by improving the magnetic balance of magnetic attraction force.

BACKGROUND ART

In recent years, due to noise reduction in engines and the accompanying reduction of sound insulation equipment, the lowering of noise in automotive alternators mounted to the engines is in demand. Noise in automotive alternators can be classified roughly into two groups including wind noise generated by fans and electromagnetic noise, and higher harmonic electromagnetic noise is particularly a problem, being harsh in tone.

Generally, it is known that magnetic attraction force proportional to rotational frequency is generated in automotive alternators in air-gap portions between claw-shaped magnetic pole portions of a field rotor and teeth of a laminated core of a stator, electromagnetic noise being generated by component parts resonating at their excitation frequencies. It is difficult to avoid resonance in component parts in automotive alternators because the working rotational frequency range is spread over 1,000 to 20,000 revolutions per minute (rpm). In a stator, in which the resonating frequency is comparatively low, resonance occurs at 1,000 to 5,000 rpm, and in a field rotor, in which the resonating frequency is comparatively high, the claw-shaped magnetic pole portions resonate in the vicinity of 9,000 rpm. Because the noise level of this electromagnetic noise is affected by the magnitude of the vibrational amplitude, it is important to suppress vibrations to reduce electromagnetic noise.

Thus, for high-speed electromagnetic noise, attempts have been made to reduce electromagnetic noise by engaging a vibration-suppressing ring in an interior portion of the claw-shaped magnetic pole portions to shift the resonating frequency of the claw-shaped magnetic pole portions to a frequency band higher than the working rotational frequency range, or to reduce electromagnetic noise by applying a resin to the claw-shaped magnetic pole portions to dampen vibration of the claw-shaped magnetic pole portions. On the other hand, for low-speed electromagnetic noise, attempts have been made such as increasing rigidity of the laminated core or the holding case of the laminated core, suppressing eccentricities in and deformation of the laminated core, or applying a resin to dampen vibration of the laminated core. Furthermore, magnetic noise can be reduced by widening the gap between the laminated core and the field rotor to reduce magnetic attraction force, but this countermeasure leads to declines in output.

However, from the viewpoint of improving output, automotive alternators of this kind are generally designed such that the axial length of the laminated core of the stator is shorter than the axial length of a Lundell-type core, and the outer radius of cylindrical portions is smaller than the outer radius of the field rotor, structurally making for constructions which vibrate easily. Thus, since magnetic attraction force is concentrated at tip portions of the claw-shaped magnetic pole portions and the vibrational amplitude in the radial direction increases, and in addition, the distance from the cylindrical portions to the claw-shaped magnetic pole portions is great, vibrational amplitude in an axial direction resulting from magnetic attraction force is increased, preventing electromagnetic noise from being reduced effectively even if the countermeasures described above are applied.

An attempt is proposed in Japanese Patent Non-Examined Laid-Open No. HEI 11-243673, for example, to try to achieve high output by making the laminated core of the stator and the yoke portions of the field rotor face each other to minimize the magnetic flux leaking outside from the yoke portions and thereby increase the rate of recovery of the magnetic flux generated by the field rotor.

Figure 13:
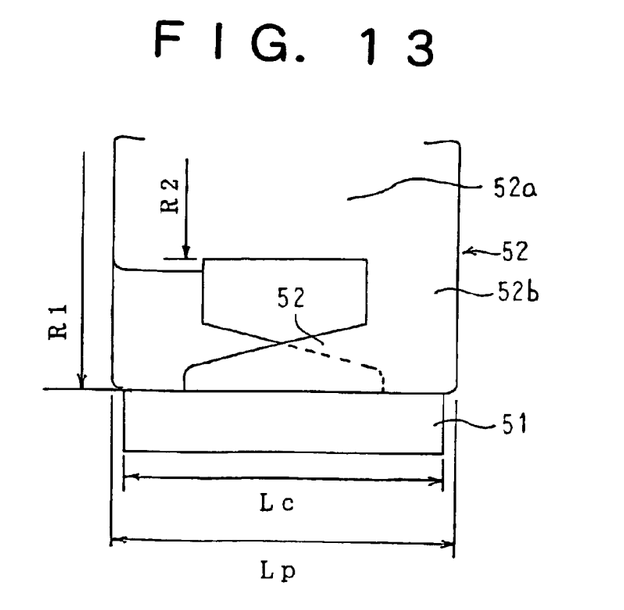
FIG. 13 is a schematic diagram showing dimensional relationships in a stator and a field rotor in a conventional automotive alternator.

In Japanese Patent Non-Examined Laid-Open No. HEI 11-243673, as shown in FIG. 13, it is stated that high output can be achieved by setting a ratio (Lc/Lp) between an axial length Lc of a laminated core 51 of a stator and an axial length Lp of a Lundell-type core 52 of a field rotor to a range from 0.7 to 1.0 and setting a ratio (R2/R1) between an outer radius R1 of the Lundell-type core 52 and an outer radius R2 of cylindrical portions 52a to a range from 0.54 to 0.60.

However, in Japanese Patent Non-Examined Laid-Open No. HEI 11-243673, because the ratio (Lc/Lp) between the axial length Lc of the laminated core 51 and the axial length Lp of the Lundell-type core 52 is set to a range from 0.7 to 1.0, the surface area of root portions of claw-shaped magnetic pole portions 52c facing the laminated core 51 is large. Thus, because the fluctuations of the magnetic poles passing the laminated core 51 are smooth and change smoothly in an axially central portion of the laminated core 51, an alternating voltage close to a sine wave is generated. On the other hand, at axial end portions of the laminated core 51, the root portions of the claw-shaped magnetic pole portions 52c and the tapered tip portions of the claw-shaped magnetic pole portions 52c pass the laminated core 51 alternately. The pass time of the root portions of the claw-shaped magnetic pole portions 52c is long, whereas the pass time of the tip portions of the claw-shaped magnetic pole portions 52c is short, generating an alternating voltage having a disrupted sine wave. The generation of this alternating voltage having a disrupted sine wave acts to increase magnetic vibration of the laminated core 51, and one problem has been that low-speed electromagnetic noise is increased by the increased vibration of the stator. In addition, when Lc becomes long (as Lc/Lp approaches 1), at axial end portions of the laminated core 51, the fluctuations of the magnetic poles are abrupt because the tip portions of the claw-shaped magnetic pole portions 52c do not face the laminated core 51 and shoulder portions of the Lundell-type core 52 are not chamfered. Hence, an alternating voltage having an even more disturbed sine wave is generated, further increasing low-speed electromagnetic noise.

Because the ratio (R2/R1) between the outer radius R1 of the Lundell-type core 52 and the outer radius R2 of the cylindrical portions 52a is set to a range from 0.54 to 0.60, another problem has been that the contact surface area between the bobbin on which the field coil is wound and the yoke portions 52b of the Lundell-type core 52 decreases, lowering the damping effect suppressing vibration of the claw-shaped magnetic pole portions 52c, thereby worsening high-speed electromagnetic noise.

In addition, because Lc/Lp is set to a range from 0.7 to 1.0, the end surfaces of the laminated core 51 are positioned near the end surfaces of the Lundell-type core 52. Consequently, in the coil end groups of the armature coil, the root ends, which have the most irregularities in a circumferential direction, radially face the shoulder portions, where pressure fluctuations are greatest in the Lundell-type core 52. Thus, yet another problem has been that the root portions of the coil end groups and the shoulder portions of the Lundell-type core 52 interfere with each other due to rotation of the Lundell-type core 52, increasing wind noise.

DISCLOSURE OF THE INVENTION

An object of the present invention is to provide an automotive alternator achieving high output by overlapping a laminated core of a stator and yoke portions of a field rotor in an axial direction, and enabling high-speed and low-speed electromagnetic noise to be reduced by prescribing dimensional relationships in the stator and the field rotor.

According to one aspect of the present invention, there is provided an automotive alternator including:

a field rotor provided with:
  a field coil; and
  a Lundell-type core having:
    a cylindrical portion on which the field coil is installed;
    yoke portions disposed so as to extend radially outward from axial end portions of the cylindrical portion; and
    claw-shaped magnetic pole portions disposed so as to extend axially from radial edge portions of the yoke portions so as to surround the field coil; and a stator composed of a laminated core and an armature coil disposed facing an outer circumference of the claw-shaped magnetic pole portions, wherein a ratio (R2/R1) between an outer radius R2 of the cylindrical portion and an outer radius R1 of the Lundell-type core is in a range from 0.50 to 0.54, and a ratio (Lc/Lp) between an axial length Lc of the laminated core and an axial length Lp of the Lundell-type core is in a range from 0.55 to 0.70.

BEST MODE FOR CARRYING OUT THE INVENTION

The preferred embodiments of the present invention will now be explained with reference to the drawings.

Embodiment 1

Figure 1:
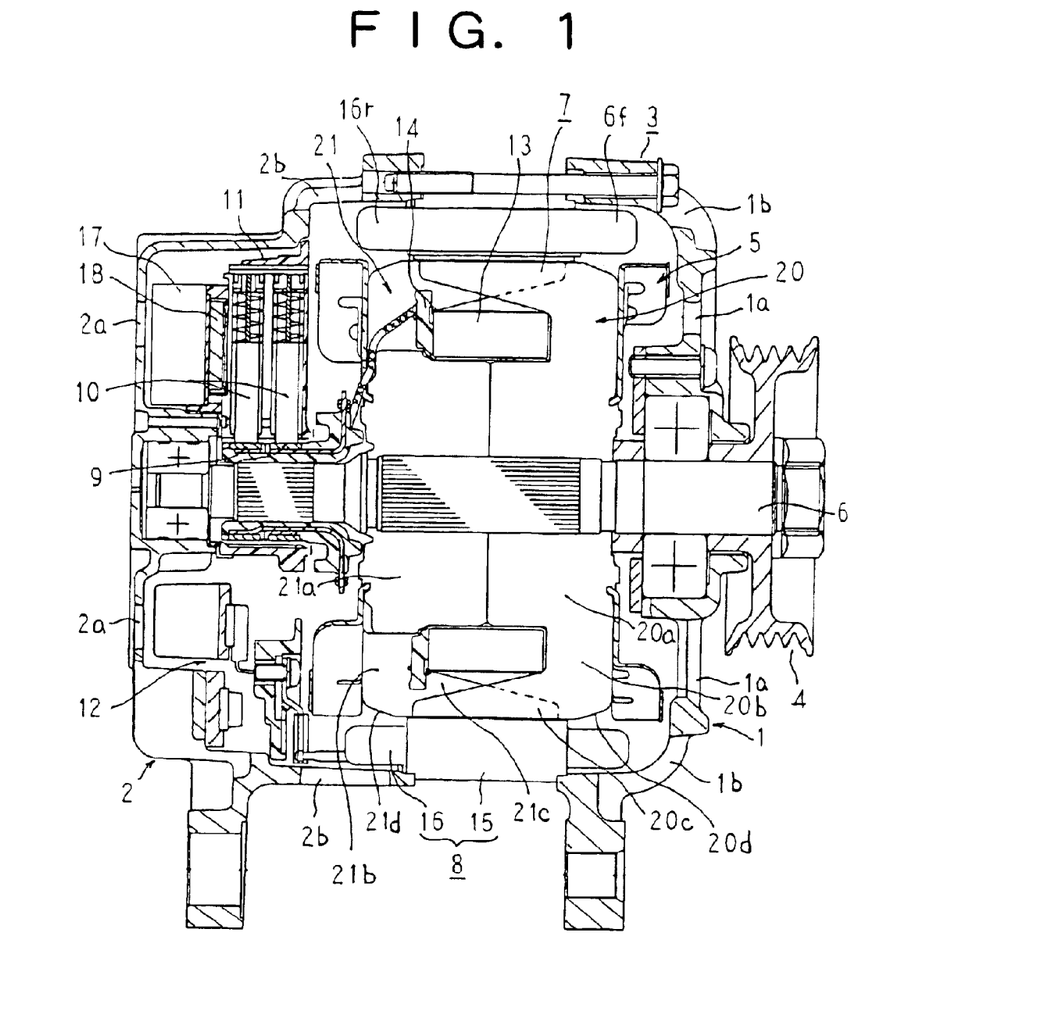
FIG. 1 is a longitudinal section showing an automotive alternator according to Embodiment 1 of the present invention.

FIG. 1 is a longitudinal section showing an automotive alternator according to Embodiment 1 of the present invention.

In FIG. 1, an automotive alternator is constructed by rotatably mounting a field rotor 7 by means of a shaft 6 inside a case 3 constituted by a front bracket 1 and a rear bracket 2 made of aluminum and fixing a stator 8 to an inner wall surface of the case 3 so as to cover an outer circumferential side of the field rotor 7.

The shaft 6 is rotatably supported in the front bracket 1 and the rear bracket 2. A pulley 4 is fixed to one end of this shaft 6, enabling rotational torque from an engine to be transmitted to the shaft 6 by means of a belt (not shown).

Slip rings 9 for supplying an electric current to the field rotor 7 are fixed to another end portion of the shaft 6, a pair of brushes 10 being housed in a brush holder 11 disposed inside the case 3 so as to slide in contact with these slip rings 9. A regulator 18 for adjusting the magnitude of an alternating voltage generated in the stator 8 is fixed by adhesive to a heat sink 17 fitted into the brush holder 11. A rectifier 12 for converting an alternating current generated in the stator 8 into a direct current is electrically connected to the stator 8 and is mounted inside the case 3.

The field rotor 7 is constituted by: a field coil 13 for generating magnetic flux on passage of an electric current; and a pair of pole cores 20 and 21 disposed so as to cover the field coil 13 functioning as a Lundell-type core in which magnetic poles are formed by the magnetic flux generated in the field coil 13. The pole cores 20 and 21 are made of iron, being constituted by: cylindrical portions 20a and 21a; yoke portions 20b and 21b disposed at a predetermined pitch in a circumferential direction, each being disposed so as to extend radially outward from an axial end portion of one of the cylindrical portions; and claw-shaped magnetic pole portions 20c and 21c disposed so as to extend axially from a radial edge portion of each of the yoke portions 20b and 21b, the cylindrical portions 20a and 21a being abutted and fixed to the shaft 6 such that the claw-shaped magnetic pole portions 20c and 21c intermesh. Shoulder portions 20d and 21d are formed by easing outermost diameter portions of axial end surfaces of the pole cores 20 and 21. The field coil 13 is wound onto a bobbin 14 and installed on the cylindrical portions 20a and 21a. Cooling fans 5 are fixed to both axial end portions of the pole cores 20 and 21.

The stator 8 is constituted by: a cylindrical laminated core 15 in which a large number of slots having grooves lying in an axial direction are disposed in a circumferential direction; and an armature coil 16 in which conducting wires are installed in the slots of this laminated core 15 and an alternating current is generated by changes in the magnetic flux from the field rotor 7 accompanying rotation of the field rotor 7.

In the automotive alternator constructed in this manner, an electric current is supplied to the field coil 13 from a battery (not shown) by means of the brushes 10 and the slip rings 9, generating a magnetic flux. The claw-shaped magnetic pole portions 20c of the pole core 20 are magnetized into North-seeking (N) poles by this magnetic flux, and the claw-shaped magnetic pole portions 21c of the pole core 21 are magnetized into South-seeking (S) poles. At the same time, rotational torque from the engine is transmitted to the shaft 6 by means of the belt and the pulley 4, rotating the field rotor 7. Thus, a rotating magnetic field is imparted to the armature coil 16, generating an electromotive force in the armature coil 16. This alternating-current electromotive force passes through the rectifier 12 and is converted into a direct current, and the magnitude thereof is adjusted by the regulator 18, charging the battery.

In the automotive alternator, the field coil 13, the armature coil 16, the rectifier 12, and the regulator 18 constantly generate heat during power generation. Thus, air intake apertures 1a and 2a and air discharge apertures 1b and 2b are disposed in the front bracket 1 and the rear bracket 2 in order to cool the heat generated by power generation.

Figure 2:
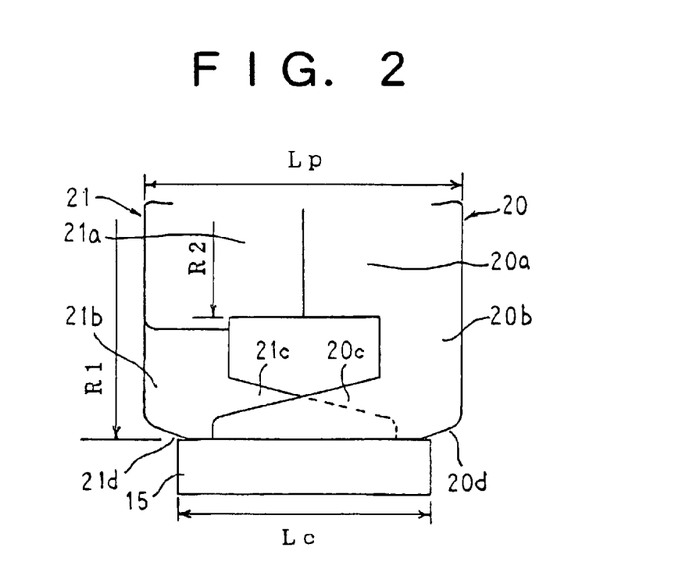
FIG. 2 is a schematic diagram showing dimensional relationships in a Lundell-type core in the automotive alternator according to Embodiment 1 of the present invention.

Here in Embodiment 1, the dimensional relationships between each portion of the pole cores 20 and 21 shown in FIG. 2 are set as follows.

A ratio (R2/R1) between an outer radius R2 of the cylindrical portions 20a and 21a and an outer radius R1 of the pole cores 20 and 21 is set to a range from 0.50 to 0.54. A ratio (Lc/Lp) between an axial length Lc of the laminated core 15 and an axial length Lp of the pole cores 20 and 21 is set to a range from 0.55 to 0.7.

Because the dimensional relationships between each portion of the pole cores 20 and 21 are set as described above, vibration of the claw-shaped magnetic pole portions 20c and 21c is reduced without reducing output, thereby providing an automotive alternator enabling low-speed electromagnetic noise resulting from claw resonance noise to be reduced and also enabling high-speed electromagnetic noise resulting from magnetic vibration of the laminated core 15 of the stator 8 to be reduced.

Figure 3:
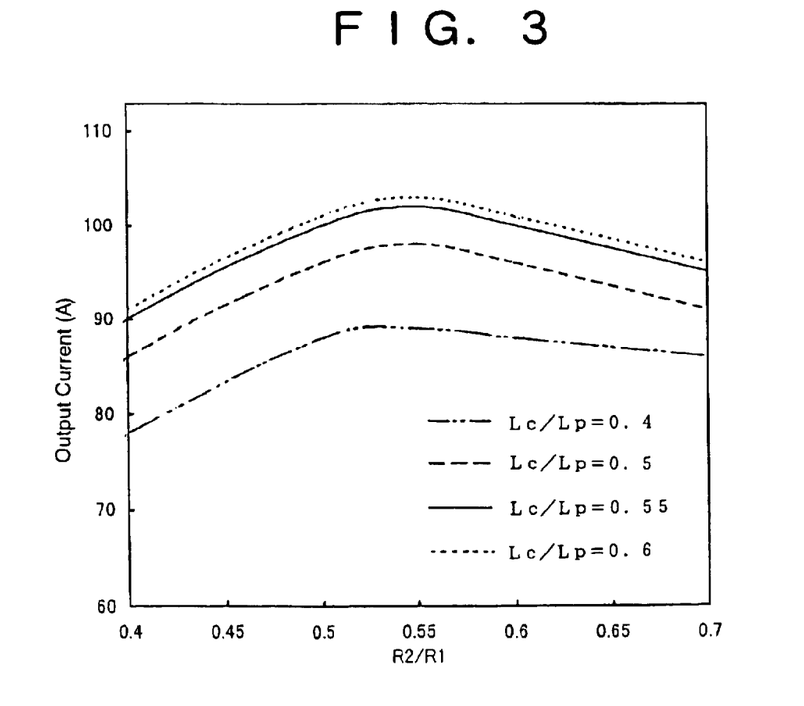
FIG. 3 is a graph showing a relationship between (R2/R1) and output current in the automotive alternator according to Embodiment 1 of the present invention.
Figure 4:
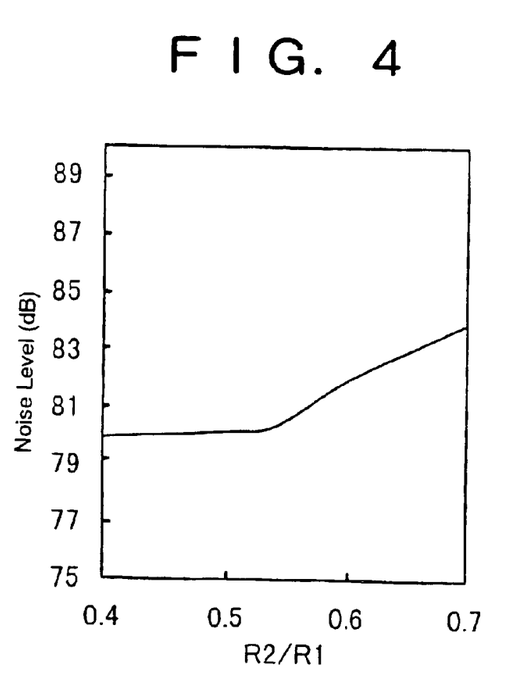
FIG. 4 is a graph showing a relationship between (R2/R1) and noise level in the automotive alternator according to Embodiment 1 of the present invention.
Figure 5:
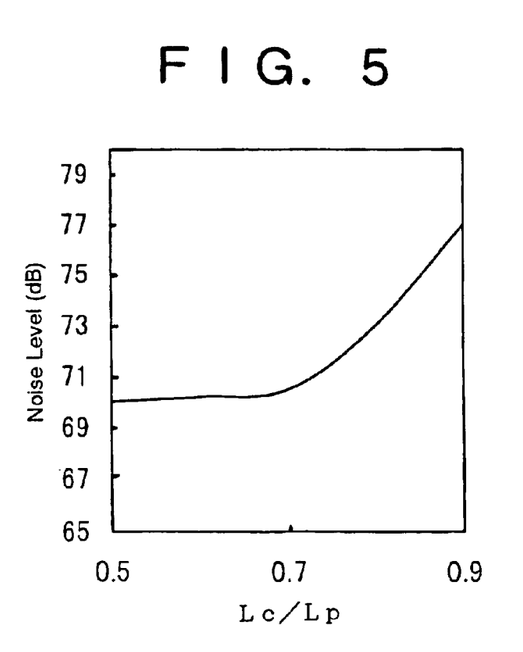
FIG. 5 is a graph showing a relationship between (Lc/Lp) and noise level in the automotive alternator according to Embodiment 1 of the present invention.

Next, FIGS. 3 to 5 are results confirming the effects of Embodiment 1.

FIG. 3 is a graph showing a relationship between (R2/R1) and output current when Lc/Lp is at predetermined values (0.4, 0.5, 0.55, and 0.6), R2/R1 being presented on the horizontal axis and output current being presented on the vertical axis. Moreover, the output current is the measured value at 2,000 rpm. FIG. 4 is a graph showing a relationship between (R2/R1) and noise level when Lc/Lp equals 0.6, R2/R1 being presented on the horizontal axis and the peak measured value of electromagnetic noise up to 10,000 rpm being presented on the vertical axis. FIG. 5 is a graph showing a relationship between (Lc/Lp) and noise level when R2/R1 equals 0.5, Lc/Lp being presented on the horizontal axis and the peak measured value of electromagnetic noise up to 5,000 rpm being presented on the vertical axis.

From FIG. 3, it can be seen that the output current gradually increases as R2/R1 increases, and gradually decreases when R2/R1 exceeds approximately 0.55. In other words, it can be seen that the output current has a maximum value when R2/R1 is around 0.55. This can be considered to be a result of the fact that if R2/R1 falls below 0.5, the passage cross-sectional area of the magnetic flux flowing through the cylindrical portions 20a and 21a is reduced, magnetically saturating the cylindrical portions 20a and 21a and preventing output from being obtained, and if R2/R1 exceeds 0.6, the thickness of the claw-shaped magnetic pole portions 20c and 21c becomes too thin when the volume of the field coil 13 is maintained at a predetermined value, magnetically saturating the claw-shaped magnetic pole portions 20c and 21c and preventing output from being obtained. Thus, from the viewpoint of high output, it is desirable that R2/R1 be greater than 0.5 and less than 0.6.

It can also be seen that the output current gradually increases as Lc/Lp increases, and is substantially saturated when Lc/Lp exceeds 0.55. This is because an increase in Lc/Lp means an increase in the amount of axial overlap between root portions of the claw-shaped magnetic pole portions 20c and 21c and the laminated core 15. In other words, because magnetic flux flows into the laminated core 15 from the root portions (the shoulder portions) of the claw-shaped magnetic pole portions and the amount of magnetic flux leaking outside from the yoke portions decreases when Lc/Lp increases, the rate of recovery of the magnetic flux generated by the field rotor rises, increasing output. This can be considered to be a result of the fact that when Lc/Lp is approximately 0.55, the rate of recovery of the magnetic flux generated by the field rotor is raised and substantially saturated, and even if Lc/Lp increases further, there is little increase in output. Thus, from the viewpoint of high output, it is desirable that Lc/Lp be greater than 0.55.

From FIG. 4, it can be seen that the noise level of high-speed electromagnetic noise is substantially maintained at a constant level when R2/R1 is between 0.4 and 0.54, and suddenly increases when R2/R1 exceeds 0.54. This is because, when the shape of the claw-shaped magnetic pole portions 20c and 21c is constant, an increase in R2/R1 means a shortening of the radial length of the yoke portions 20b and 21b. In other words, when the radial length of the yoke portions 20b and 21b is shortened, the contact surface area between the bobbin 14 on which the field coil 13 is installed and the yoke portions 20b and 21b is reduced, reducing the damping effect of the bobbin 14. It can be inferred that when R2/R1 exceeds 0.54, the damping effect of the bobbin 14 is reduced, and the noise level of high-speed electromagnetic noise increases because vibration of the claw-shaped magnetic pole portions 20c and 21c is not damped. Furthermore, when the winding space of the field coil 13 is constant, an increase in R2/R1 means a reduction in the thickness of the claw-shaped magnetic pole portions 20c and 21c. In other words, when the thickness of the claw-shaped magnetic pole portions 20c and 21c is reduced, the result is similar because the rigidity of the claw-shaped magnetic pole portions 20c and 21c is reduced and the claw-shaped magnetic pole portions 20c and 21c are more likely to vibrate. From this, it is desirable that R2/R1 be less than 0.54 from the point of view of reducing high-speed electromagnetic noise.

From FIG. 5, it can be seen that the noise level of low-speed electromagnetic noise is substantially maintained at a constant level when Lc/Lp is between 0.5 and 0.7, and suddenly increases when Lc/Lp exceeds 0.7. This is because when Lc/Lp exceeds 0.7, the surface area of the root portions of the claw-shaped magnetic pole portions 20c and 21c facing the laminated core 15 increases. Thus, because the fluctuations of the magnetic poles passing the laminated core 15 are smooth and change smoothly in an axially central portion of the laminated core 15, an alternating voltage close to a sine wave is generated, but at axial end portions of the laminated core 15, the root portions of the claw-shaped magnetic pole portions 20c and 21c and the tapered tip portions of the claw-shaped magnetic pole portions 20c and 21c pass the laminated core 15 alternately. The pass time of the root portions of the claw-shaped magnetic pole portions 20c and 21c is long, whereas the pass time of the tip portions of the claw-shaped magnetic pole portions 20c and 21c is short, generating an alternating voltage having a disrupted sine wave. The generation of this alternating voltage having a disrupted sine wave acts to increase magnetic vibration of the laminated core 15, and it can be considered that low-speed electromagnetic noise is increased by the increased vibration of the stator. In addition, when Lc becomes long (as Lc/Lp approaches 1), at axial end portions of the laminated core 15, the tip portions of the claw-shaped magnetic pole portions 20c and 21c do not face the laminated core 15, and it can be considered that low-speed electromagnetic noise is further increased because an alternating voltage having an even more disturbed sine wave is generated. From this, it is desirable that Lc/Lp be less than 0.7 from the point of view of reducing low-speed electromagnetic noise.

From the above, an automotive alternator enabling high-speed and low-speed electromagnetic noise to be reduced while ensuring high output can be obtained by making R2/R1 greater than 0.50 and less than 0.54 and Lc/Lp greater than 0.55 and less than 0.7.

In Embodiment 1, because Lc/Lp is set to less than 0.7, the end surfaces of the laminated core 51 are positioned away from the end surfaces of the pole cores 20 and 21. Consequently, in the coil end groups 16f and 16r of the armature coil 16, the root ends, which have the most irregularities in a circumferential direction, do not radially face the shoulder portions 20d and 21d, where pressure fluctuations are greatest in the pole cores 20 and 21. Thus, wind noise resulting from interference between the root portions of the coil end groups 16f and 16r and the shoulder portions 20d and 21d of the pole cores 20 and 21 arising due to rotation of the pole cores 20 and 21 is reduced. In addition, wind noise resulting from interference between the root portions of the coil end groups 16f and 16r and the shoulder portions 20d and 21d of the pole cores 20 and 21 is further reduced because the shoulder portions 20d and 21d are formed by chamfering the outermost diameter portions of the axial end surfaces of the pole cores 20 and 21.

Furthermore, wind-splitting noise generated at the outermost diameter portions of the axial end surfaces of the pole cores 20 and 21 due to rotation of the field rotor 7 is reduced because the shoulder portions 20d and 21d are formed by chamfering the outermost diameter portions of the axial end surfaces of the pole cores 20 and 21, enabling wind noise to be reduced further.

Embodiment 2

Figure 6:
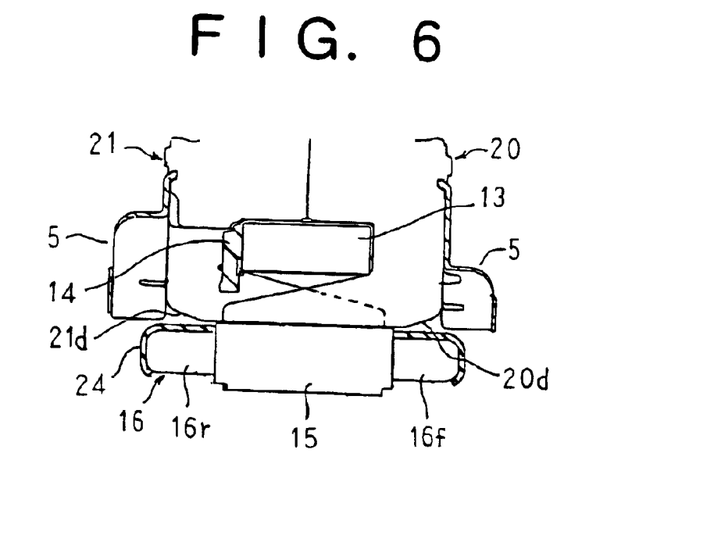
FIG. 6 is a partial cross section showing an automotive alternator according to Embodiment 2 of the present invention.

In Embodiment 2, as shown in FIG. 6, ring-shaped covers 24 made of glass-reinforced epoxy resin having a smooth outer surface are disposed so as to cover an inner circumferential side and apex portions of the coil end groups 16f and 16r of the armature coil 16. Moreover, the rest of the construction is constructed in a similar manner to Embodiment 1 above.

In Embodiment 2, because the covers 24 are disposed so as to cover an inner circumferential side and apex portions of the coil end groups 16f and 16r of the armature coil 16, the covers 24 radially face the shoulder portions 20d and 21d, where pressure fluctuations are greatest in the pole cores 20 and 21.

Thus, because the coil end groups 16f and 16r, which have irregularities in a circumferential direction, are isolated from the shoulder portions 20d and 21d by the covers 24, wind noise resulting from interference between the coil end groups 16f and 16r and the shoulder portions 20d and 21d arising due to rotation of the field rotor 7 in Embodiment 1 above is eliminated. Furthermore, because there are few irregularities on the outer surfaces of the covers 24 in the circumferential direction, wind noise resulting from interference between the covers 24 and the shoulder portions 20d and 21d arising due to rotation of the field rotor 7 is reduced. Hence, an automotive alternator having low wind noise compared to Embodiment 1 above can be achieved.

Moreover, when the number of poles in the field rotor is increased to twenty poles or twenty-four poles, the number of shoulder portions in the Lundell-type core also increases, increasing wind noise resulting from interference between the coil end groups and the shoulder portions. According to Embodiment 2, because interference between the coil end groups and the shoulder portions is avoided by disposing the covers 24, increases in wind noise due to increases in the number of poles in the field rotor are suppressed. Consequently, the wind noise-reducing effects according to Embodiment 2 become more pronounced as the number of poles in the field rotor is increased.

Embodiment 3

Figure 7:
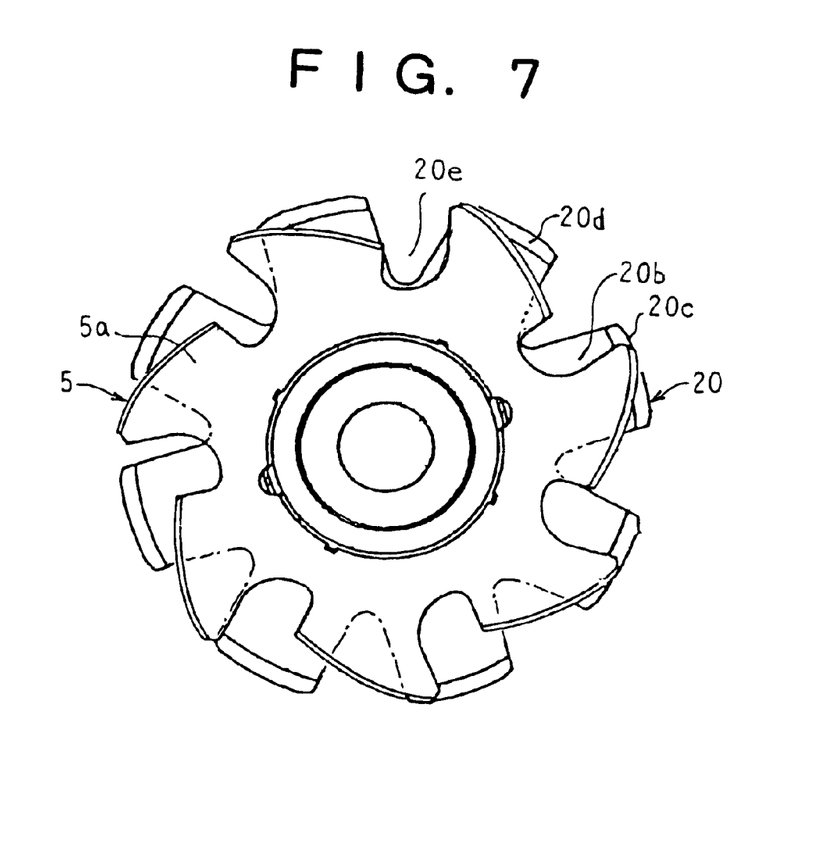
FIG. 7 is a schematic diagram showing a relationship between a cooling fan and a pole core in an automotive alternator according to Embodiment 3 of the present invention.

In Embodiment 3, as shown in FIG. 7, base portions 5a of the front-end cooling fan 5 are formed into a shape such that valley portions 20e formed between adjacent daw-shaped magnetic pole portions 20c are open in an axial direction. Moreover, the rest of the construction is constructed in a similar manner to Embodiment 1 above.

Here, at the front end, a cooling airflow is sucked in through the air intake apertures 1a by rotation of the cooling fans 5, and is then deflected centrifugally and discharged outside through the air discharge apertures 1b. On the other hand, at the rear end, a cooling airflow is sucked in through the air intake apertures 2a by rotation of the cooling fans 5, cools the rectifier 12 and the regulator 18, and is then deflected centrifugally and discharged outside through the air discharge apertures 2b. Here, because the rectifier 12 and the regulator 18 are disposed in the ventilation channel for the cooling airflow at the rear end, ventilation resistance at the rear end is greater than at the front end. Pressure on the intake side of the front-end cooling fan 5 is greater than pressure on the intake side of the rear-end cooling fan 5.

In Embodiment 3, because the base portions 5a of the front-end cooling fan 5 are formed into a shape such that the valley portions 20e are open in an axial direction, an axial flow of the cooling airflow arises which flows from the front end where pressure on the intake side of the cooling fan 5 is great through the valley portions 20e to the rear end. Hence, because the field coil 13 is cooled, magnetomotive force increases, achieving an improvement in output.

Because a portion of the high-pressure front-end cooling airflow flows to the rear end as an axial flow, the flow rate of the high-pressure cooling airflow supplied to the front-end coil end group 16f decreases, reducing interference noise in the coil end groups 16f, thereby reducing wind noise.

Embodiment 4

Figure 8:
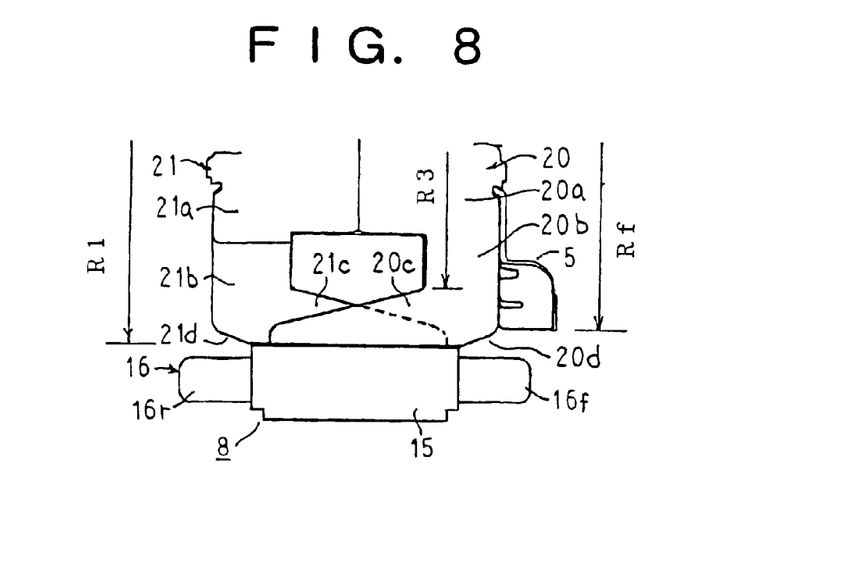
FIG. 8 is a schematic diagram showing dimensional relationships between a stator and a field rotor in an automotive alternator according to Embodiment 4 of the present invention.

In Embodiment 4, as shown in FIG. 8, an outermost radial dimension Rf of the cooling fans 5 mounted to the axial end surfaces of the pole cores 20 and 21 is set to a range greater than R3 and less than R1 and the cooling fans 5 overlap the coil end groups 16f and 16r of the armature coil 16 in an axial direction. Here, R3 is an inner radial dimension of the root portions of the claw-shaped magnetic pole portions 20c and 21c. Moreover, the rest of the construction is constructed in a similar manner to Embodiment 1 above.

In Embodiment 4, an outermost radial dimension Rf of the cooling fans 5 mounted to the axial end surfaces of the pole cores 20 and 21 is set to a range greater than R3 and less than R1. In other words, the cooling fans 5 are fixed to the axial end surfaces of the pole cores 20 and 21 so as to reach from the cylindrical portions 20a and 21a of the pole cores 20 and 21 across the yoke portions 20b and 21b to part of the root portions of the claw-shaped magnetic pole portions 20c and 21c. Hence, claw resonance noise is reduced because axial vibrations in which the root portions of the yoke portions 20b and 21b are pivot points are suppressed, enabling high-speed electromagnetic noise to be reduced.

Because the cooling fans 5 overlap the coil end groups 16f and 16r of the armature coil 16 in an axial direction, cooling airflows are supplied to the coil end groups 16f and 16r in large quantities by the cooling fans 5. Thus, cooling of the coil end groups 16f and 16r is improved, suppressing temperature increases in the armature coil 16.

Here, the length of the conductors in the armature coil 16 is also increased together with an increase in the axial length Lc of the laminated core 15, increasing conductor resistance in the armature coil 16. This increase in conductor resistance in the armature coil 16 leads to an increase in the amount of heat generated, but temperature increases in the armature coil 16 are reliably suppressed due to the cooling of the coil end groups 16f and 16r being improved.

Embodiment 5

In Embodiment 5, a winding construction of an armature coil 16A is prescribed.

Figure 9:
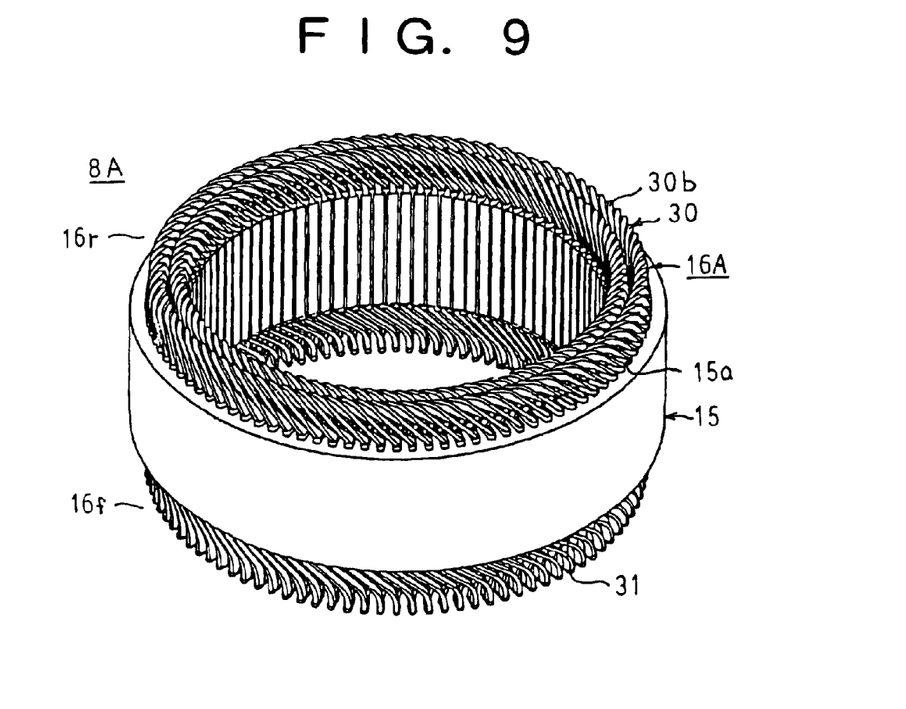
FIG. 9 is a perspective showing a stator in an automotive alternator according to Embodiment 5 of the present invention.
Figure 10:
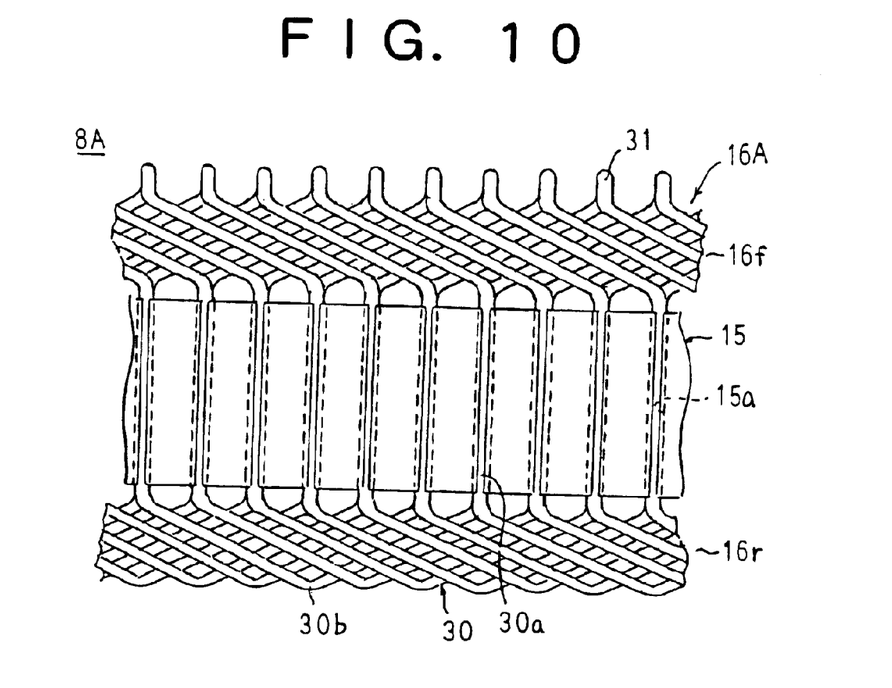
FIG. 10 is a plan showing part of the stator in the automotive alternator according to Embodiment 5 of the present invention viewed from a inner circumferential side.
Figure 11:
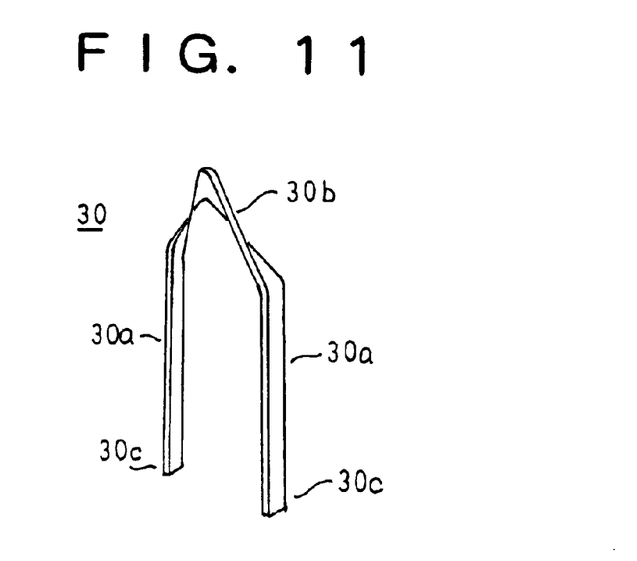
FIG. 11 is a perspective showing a conductor segment used in an armature coil of the stator in the automotive alternator according to Embodiment 5 of the present invention.

FIG. 9 is a perspective showing a stator of an automotive alternator according to Embodiment 5 of the present invention, FIG. 10 is a plan showing the stator of the automotive alternator according to Embodiment 5 of the present invention viewed from a inner circumferential side, and FIG. 11 is a perspective showing a conductor segment used in an armature coil of the stator of the automotive alternator according to Embodiment 5 of the present invention.

A construction of the stator according to Embodiment 5 will now be explained.

As shown in FIG. 11, a conductor segment 30 functioning as a strand of wire constituting the armature coil 16A is prepared by bending a flat copper wire material covered with an electrically-insulating coating, being formed into a general U shape in which a pair of straight portions 30a are linked by a generally V-shaped turn portion 30b.

Two conductor segments 30 are inserted from the rear end of the laminated core 15 into each of pairs of slots 15a separated by six slots (corresponding to a pitch of one magnetic pole). Here, the straight portions 30a of one conductor segment 30 are housed in a first position from the inner radial side (hereinafter "Address 1") in one slot 15a and a second position from the inner radial side (hereinafter "Address 2") in the other slot 15a six slots away, and the straight portions 30a of the other conductor segment 30 are housed in a third position from the inner radial side (hereinafter "Address 3") in one slot 15a and a fourth position from the inner radial side (hereinafter "Address 4") in the other slot 15a six slots away. Hence, four straight portions 30a are housed in each of the slots 15a so as to line up in a single row in a radial direction. The end portions of the conductor segments 30 extending outward at the front end of the laminated core 15 are bent circumferentially into a splayed shape.

At the front end of the laminated core 15, the end portions 30c of the conductor segments 30 extending outward from Address 1 of one slot 15a of each of the slot pairs are joined together with the end portions 30c of other conductor segments 30 extending outward from Address 2 of other slots 15a six slots away, forming six single-turn wave windings. The end portions 30c of the conductor segments 30 extending outward from Address 3 of one slot 15a of each of the slot pairs are also joined together with the end portions 30c of other conductor segments 30 extending outward from Address 4 of the other slots 15a six slots away, forming six single-turn wave windings.

Moreover, although not shown, six phases of windings having four turns are formed by connecting in series each of the windings installed in the same slot group, and the armature coil 16A, which is composed of two three-phase alternating-current windings, is formed by forming three phases of windings into an alternating-current connection in each case.

In a stator 8A constructed in this manner, the number of slots per phase per pole is two, and as shown in FIG. 9, the turn portions 30b of the conductor segments 30 forming coil ends are arranged so as to line up in two layers in single rows in a radial direction and form two rows in a circumferential direction, constituting the coil end group 16r at the rear end of the laminated core 15, and the joint portions 31 between the end portions 30c of the conductor segments 30 forming coil ends are arranged so as to line up in two layers in single rows in a radial direction and form two rows in a circumferential direction, constituting the coil end group 16f at the front end of the laminated core 15. In the coil end groups 16f and 16r, as shown in FIG. 10, the inclined portions of the coil ends are arranged in rows in a circumferential direction so as to have clearance from each other.

In this stator 8A, because coil ends formed by connection patterns connecting different layers in slots separated by six slots are arranged in neat rows in a circumferential direction, the cooling airflows blowing from the cooling fans 5 flow along the inclined portions of the coil ends and are smoothed, significantly reducing wind noise. Because the coil ends are arranged in neat rows in a circumferential direction, there are also fewer circumferential irregularities in the root portions of the coil end groups 16f and 16r, reducing wind noise resulting from interference between the coil end groups 16f and 16r and the shoulder portions 20d and 21d.

Because the cooling airflows flow along the inclined portions of the coil ends, cooling of the armature coil 16A is increased, enabling temperature increases in the stator 8A to be suppressed. In addition, because the coil ends are arranged so as to have clearance in a circumferential direction, the cooling airflows ventilate inside the coil end groups 16f and 16r, further improving cooling of the armature coil 16A. Thus, even if the amount of heat generated by the armature coil 16A increases together with the increase in the axial length Lc of the laminated core 15, temperature increases in the armature coil 16A are reliably suppressed due to the cooling of the coil end groups 16f and 16r being improved.

Embodiment 6

Figure 12:
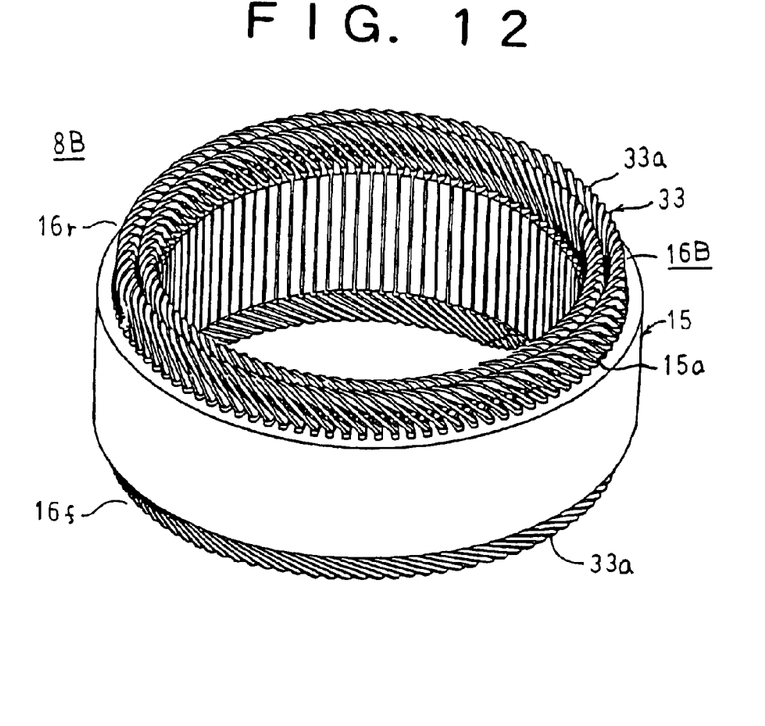
FIG. 12 is a perspective showing a stator in an automotive alternator according to Embodiment 6 of the present invention.

In Embodiment 6, as shown in FIG. 12, an armature coil 16B is prepared using continuous copper wires 33. Moreover, Embodiment 6 is constructed in a similar manner to Embodiment 5 above except for the fact that the continuous copper wires 33 are used in place of the generally U-shaped conductor segments 30.

In a stator 8B according to Embodiment 6, because coil ends formed by connection patterns connecting different layers in slots separated by six slots are also arranged in neat rows in a circumferential direction, the cooling airflows blowing from the cooling fans 5 flow along the inclined portions of the coil ends and are smoothed, significantly reducing wind noise. Because the coil ends are arranged in neat rows in a circumferential direction, there are also fewer circumferential irregularities in the root portions of the coil end groups 16f and 16r, reducing wind noise resulting from interference between the coil end groups 16f and 16r and the shoulder portions 20d and 21d.

Because the cooling airflows flow along the inclined portions of the coil ends, cooling of the armature coil 16A is increased, enabling temperature increases in the stator 8B to be suppressed. In addition, because the coil ends are arranged so as to have clearance in a circumferential direction, the cooling airflows ventilate inside the coil end groups 16f and 16r, further improving cooling of the armature coil 16A. Thus, even if the amount of heat generated by the armature coil 16A increases together with the increase in the axial length Lc of the laminated core 15, temperature increases in the armature coil 16A are reliably suppressed due to the cooling of the coil end groups 16f and 16r being improved.

In addition, according to Embodiment 6, because the continuous copper wires 33 are used, the number of joints is significantly reduced compared to Embodiment 5 above, improving workability. Furthermore, because the coil end groups 16f and 16r are constituted by turn portions 33a of the copper wires 33, the axial length of the coil end group 16f can be lowered compared to Embodiment 5 above, reducing ventilation resistance in the coil end group 16f, thereby enabling wind noise to be reduced.

Moreover, Embodiments 5 and 6 above have been explained for stators in which the number of slots per phase per pole is two, but they may also be applied to stators in which the number of slots per phase per pole is three or more. In that case, the surface area of the conductors constituting the coil end groups increases, further improving cooling of the armature coil. Furthermore, in Embodiments 5 and 6 above, because the coil ends are arranged in neat rows in a circumferential direction, there is a smoothing effect on the cooling airflows on the inner circumferential side of the coil end groups. As the number of slots per phase per pole increases, the number of the coil ends constituting the inner circumferential side of the coil end groups increases, increasing the smoothing effect on the cooling airflows, thereby enabling cooling of the armature coil to be improved.

In Embodiments 5 and 6 above, the straight portions of the strands of wire are arranged in four layers in single rows in a slot depth direction inside the slots 15a, but the number of layers of the straight portions of the strands of wire arranged in single rows in a slot depth direction inside the slots 15a is not limited to four layers; it may also be six layers, eight layers, or more, for example.

In Embodiments 5 and 6 above, a flat copper wire material is used for the strands of wire, but the strands of wire are not limited to a wire material having a flat cross-sectional shape; a wire material having a circular cross-sectional shape, for example, may also be used. In that case, ventilation resistance in the coil end groups is reduced, enabling reductions in wind noise and improvements in cooling of the armature coil.

A varnish may be applied to the whole of the field rotor 7. In that case, the varnish is impregnated into the field coil 13 wound onto the bobbin 14, and gaps between the windings of the field coil 13 are filled with the varnish. Thus, heat transfer between the windings of the field coil 13. improves, suppressing temperature increases in the field coil 13, thereby enabling increases in magnetomotive force. Furthermore, the varnish is injected between the cooling fans 5 and the pole cores 20 and 21 and acts as a damper, damping vibration of the pole cores 20 and 21, thereby enabling reductions in high-speed electromagnetic noise.

As explained above, according to one aspect of the present invention, there is provided an automotive alternator including:

a field rotor provided with:
  a field coil; and
  a Lundell-type core having:
    a cylindrical portion on which the field coil is installed;
    yoke portions disposed so as to extend radially outward from axial end-portions of the cylindrical portion; and
    claw-shaped magnetic pole portions disposed so as to extend axially from radial edge portions of the yoke portions so as to surround the field coil; and
a stator composed of a laminated core and an armature coil disposed facing an outer circumference of the claw-shaped magnetic pole portions,
wherein a ratio (R2/R1) between an outer radius R2 of the cylindrical portion and an outer radius R1 of the Lundell-type core is in a range from 0.50 to 0.54, and
a ratio (Lc/Lp) between an axial length Lc of the laminated core and an axial length Lp of the Lundell-type core is in a range from 0.55 to 0.70, thereby providing an automotive alternator enabling high-speed and low-speed electromagnetic noise to be reduced while ensuring high output.

A cooling fan mounted to at least one axial end surface of the Lundell-type core may be provided, the cooling fan overlapping a coil end group of the armature coil in an axial direction, whereby a cooling airflow is supplied directly to the coil end group by the cooling fan, improving cooling of the armature coil. Hence, temperature increases in the armature coil resulting from increasing the axial length Lc of the stator can be suppressed.

The coil end group of the armature coil may be constructed by arranging coil ends so as to align in a row in a circumferential direction, whereby wind noise resulting from interference between shoulder portions of the Lundell-type core and the coil end group is reduced, and a cooling airflow is supplied by the cooling fan flows along the coil ends, thereby reducing wind noise resulting from interference between the cooling airflow and the coil end group and improving cooling of the armature coil.

The coil ends constituting the coil end group of the armature coil may be arranged so as to have clearance in a circumferential direction, whereby the cooling airflow supplied by the cooling fan ventilates the inside of the coil end group, further improving cooling of the armature coil.

A pair of cooling fans mounted to both axial end surfaces of the Lundell-type core may be provided, a valley portion formed between adjacent pairs of the claw-shaped magnetic pole portions being open in an axial direction on the axial end surface of the Lundell-type core on which the cooling fan having the higher pressure of the pair of cooling fans is mounted, whereby a cooling airflow passes through the valley portion from the end where the pressure on the intake side of the cooling fans is higher and flows inside the Lundell-type core. Hence, magnetomotive force increases because temperature increases in the field coil are suppressed, achieving improvements in output.

A cooling fan mounted to at least one axial end surface of the Lundell-type core may be provided, an outermost radial dimension Rf of the cooling fan being smaller than the outer radius R1 of the Lundell-type core, whereby axial vibrations in which the root portions of the yoke portions of the Lundell-type core are pivot points are suppressed, reducing claw resonance noise, thereby enabling high-speed electromagnetic noise to be reduced.

A ring-shaped cover having a smooth outer surface may be disposed so as to cover at least an inner circumferential side of a coil end group of the armature coil, eliminating wind noise resulting from interference between shoulder portions of the Lundell-type core and the coil end group.

What is claimed is:

1. An automotive alternator comprising:
    a field rotor provided with:
        a field coil; and
        a Lundell-type core having:
            a cylindrical portion on which said field coil is installed;
            yoke portions disposed so as to extend radially outward from axial end portions of said cylindrical portion; and
            claw-shaped magnetic pole portions disposed so as to extend axially from radial edge portions of said yoke portions so as to surround said field coil; and
    a stator composed of a laminated core and an armature coil disposed facing an outer circumference of said claw-shaped magnetic pole portions,
    wherein a ratio (R2/R1) between an outer radius R2 of said cylindrical portion and an outer radius R1 of said Lundell-type core is in a range from 0.50 to 0.54, and
    a ratio (Lc/Lp) between an axial length Lc of said laminated core and an axial length Lp of said Lundell-type core is in a range from 0.55 to 0.70.

2. The automotive alternator according to claim 1, further comprising a cooling fan mounted to at least one axial end surface of said Lundell-type core, wherein said cooling fan overlaps a coil end group of said armature coil in an axial direction.

3. The automotive alternator according to claim 2 wherein said coil end group of said armature coil is constructed by arranging coil ends so as to align in a row in a circumferential direction.

4. The automotive alternator according to claim 3 wherein said coil ends constituting said coil end group of said armature coil are arranged so as to have clearance in a circumferential direction.

5. The automotive alternator according to claim 1, further comprising a pair of cooling fans mounted to both axial end surfaces of said Lundell-type core, wherein a valley portion formed between adjacent pairs of said claw-shaped magnetic pole portions is open in an axial direction on an axial end surface of said Lundell-type core on which the cooling fan having the higher pressure of said pair of cooling fans is mounted.

6. The automotive alternator according to claim 1, further comprising a cooling fan mounted to at least one axial end surface of said Lundell-type core, wherein an outermost radial dimension Rf of said cooling fan is smaller than said outer radius R1 of said Lundell-type core.

7. The automotive alternator according to claim 1, further comprising a ring-shaped cover having a smooth outer surface disposed so as to cover at least an inner circumferential side of a coil end group of said armature coil.

* * * * *